June 4, 1940.  F. E. RICE  2,203,365
BEER COOLING DEVICE
Filed Oct. 1, 1938
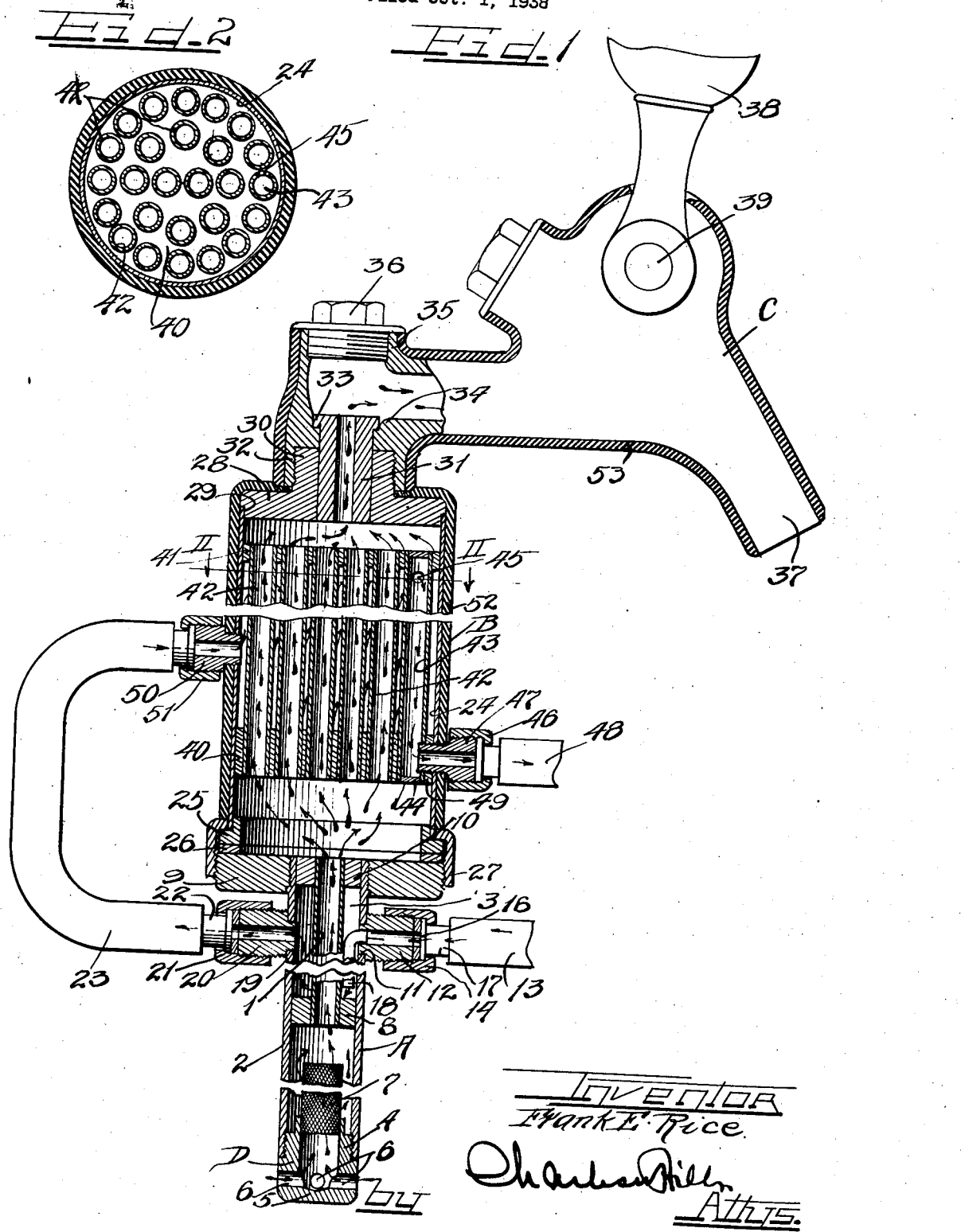
Inventor
Frank E. Rice Patented June 4, 1940

2,203,365

UNITED STATES PATENT OFFICE 2,203,365

BEER COOLING DEVICE

Frank E. Rice, Detroit, Mich.

Application October 1, 1938, Serial No. 232,732

1 Claim. (Cl. 225—40)

The present invention relates to a beer cooling device, and more particularly to a unitary device for direct draw of beer from a keg or barrel, whereby the beer may be cooled in the device and discharged from the faucet at a palatable temperature.

An object of the present invention is to provide a unitary structure whereby beer may be directly drawn from a barrel or keg through a discharge faucet, and cooled to a palatable temperature.

Another object of the present invention is to provide a unitary beer draught device comprising a water jacketed draught tube and a cooling chamber through which the beer passes to the faucet, and in which the draught tube and cooling chamber are cooled by a cooling liquid, such as iced water, delivered to the water jacketed draught tube and subsequently to the cooling chamber, in sequential order from a single source of supply.

A further object of the present invention is to provide a novel cooling chamber arrangement for a unitary draught structure, whereby beer may be cooled in its passage from the interior of a barrel to a faucet.

A still further object of the invention is to provide a unitary draught tube structure for direct draw of beer from a barrel to a faucet which includes cooling means surrounding the draught tube, and additional cooling means, such as a chamber, through which cooling fluid, such as iced water, is sequentially circulated from a single inlet.

The invention has for a further object the provision of a unitary draught tube structure including a faucet with an intermediate chamber between the faucet and tube providing a cooling zone, wherein the faucet and chamber are insulated to prevent rapid heat interchange between the atmosphere and the interior of the faucet and chamber.

Another and yet further object of the invention is to provide a unitary draught tube cooling chamber and faucet structure for direct draw of beer from a barrel, so constructed and arranged that the several parts may be readily disassembled for cleaning purposes, and re-assembled for use.

The above, other and further objects of the present invention will be apparent from the following description and accompanying drawing.

The accompanying drawing illustrates an embodiment of the present invention, and the views thereof are as follows:

Figure 1 is a central vertical sectional view through a unitary structure of the present invention, showing details of construction and arrangement.

Figure 2 is a horizontal sectional view taken substantially in the plane indicated by the line II—II of Figure 1.

The drawing will now be explained.

The chosen exemplification of the present invention includes, generally, a draught tube structure A, a cooling chamber B, and a faucet C.

The draught tube scructure A, as illustrated, comprises a draught tube 1 surrounded by a casing or second tube 2 spaced from the walls of the draught tube 1 to provide a fluid space 3 between them. The casing 2 is of sufficient length, so that when the device is installed in the barrel or keg, the lower end of the casing will be adjacent the bottom of the barrel. As illustrated, the lower end of the casing 2 is interiorly threaded to receive the threaded portion 4 of a closure plug D having an imperforate lower end 5 and side apertures 6 through which beer may enter the interior of the casing and the draught tube 1. The plug D is provided with a hollow interior projecting upwardly from the lower end of the casing 2, with which is connected a screen 7.

The lower end of the draught tube 1 terminates a short distance above the screen 7 and is arranged with its lower extremity surrounded by a ring 8 which occupies the space between the exterior of the draught tube 1 and the interior of the casing 2 for the purpose of sealing the lower end of the liquid space 3. The upper end of the casing 2 is exteriorly threaded to engage a threaded opening in the lower head 9 of the cooling chamber. The upper extremity of the draught tube 1 is surrounded by a ring 10 closing the space between the exterior of the upper extremity of the draught tube and the casing 2 and forming the upper end of the fluid space 3.

Immediately adjacent the head 9, the casing 2 is apertured at 11 to receive a nipple 12 in threaded engagement with and constituting an inlet to the fluid space 3. A hose 13 or other duct means is secured in flow communication with the nipple 12 by means of a threaded sleeve 14 engaging the threaded exterior of the nipple and engaging against a flange 16 formed on the reduced end 17 of the connection to the hose or duct 13, as may be readily observed in Figure 1.

Extending downwardly in the fluid space 3 and in flow communication with the nipple 12 is a delivery pipe 18, the lower end of which terminates a short distance above the sealing ring 8 at the bottom of the fluid space 3, so as to deliver to said fluid space cooling liquid, such as iced water, at the lower end of the draught tube 1.

The casing 2 is provided with another threaded aperture 19 for receiving a like nipple 20, to which is connected, by a sleeve nut 21, a hose connection 22, the latter being suitably secured to a hose or other duct 23. The nipple 20 is in flow communication with the fluid space 3 near the upper end thereof, so that before the cooling liquid entering the space 3 from the pipe 18 may escape from such space, it must rise upwardly about the draught tube 1, thus effectually cooling whatever beer there may be in the draught tube.

The cooling compartment or chamber structure B comprises a cylindrical shell 24, open at both ends, the lower end engaging an annular flange of a ring member 25 interposed between the lower end of the shell 24 and the head 9. A gasket 26 is arranged between the ring 25 and the head 9 for the purpose of making a leak-tight joint. The ring 25 is held in tight engagement with the head 9 by means of a skirted or flanged nut 27 interiorly threaded to engage external threads on the periphery of the head and inturned to engage a portion of the annular flange of the ring, as may be readily observed in Figure 1.

An upper head 28 is flanged at 29 to engage the upper end of the shell 24 in leak-tight engagement. The head is formed with an upstanding central hub portion 30 which is bored to receive a nipple 31, through which nipple the beer from within the cooling chamber B passes to the faucet C. The exterior of the hub portion 30 is threaded to receive the threaded bored portion 32 of the faucet casting, the nipple 31 having a flanged upper end 33 which rests in a recess 34 in the faucet casting, the faucet casting being suitably bored to receive the nipple. The faucet casting is formed with a threaded bored portion 35 in alignment with a nipple 31, which bore is normally closed by a plug 36.

The faucet C is of known shape and construction having the usual nozzle 37 and a ball actuator 38 connected to a shaft 39 which operates the valve within the faucet to open and close flow communication to the nozzle 37. The interior construction of the nozzle being of known form and characteristics, it is not illustrated, as the same forms no part of the present invention.

Suitably secured within the interior of the shell 24 and near the lower end thereof is a perforated header 40 provided with a plurality of holes extending axially of the same, with the holes in spaced relation one to another. Suitably secured within the shell 24 and near the upper end thereof is a second header 41 provided with a plurality of holes arranged to register with the holes in the header 40.

Secured in the holes or openings in the headers 40 and 41 are a plurality of open-ended pipes 42 affording flow through the chamber B from below the lower header 40 to above the upper header 41. One pipe 43 is closed at its ends by suitable caps 44, thus shutting it off from the path of beer travel through the cooling compartment B. Near the upper end of the pipe 43, it is apertured at 45 to constitute an overflow opening. Adjacent the lower end of the pipe 43, a nipple 46 is entered through the shell 24 and into the interior of the pipe, affording outlet for the fluid within the pipe 43. The nipple 46 is connected by means of a skirted or flanged nut 47 to an outlet hose or duct 48. Surrounding the nipple between the pipe 43 and the shell 24 is a washer or gasket 49 for preventing leakage through the shell.

The space within the cooling chamber or compartment B between the headers 40 and 41 and surrounding the several pipes constitutes a water jacket for the cooling fluid. The cooling fluid is admitted to this water jacket through the hose 23 by means of a nipple 50 threaded into an opening in the shell 24 and into the space between the shell and the several pipes, the connection being made by means of a skirted or flanged nut 51.

The construction is such that the water jacket surrounding the pipes 42 is sealed against escape of the cooling fluid to the beer passing through the pipes, and consequently beer cannot escape from these pipes or from the interior of the cooling chamber B to the water jacket. Cooling fluid, such as iced water, is admitted to the lower end of the space 3 surrounding the draught tube 1 from the inlet 13, the fluid passing upwardly about the draught tube 1, escaping through the hose 23 to the water jacket about the pipes 42, and then when the head of water in the jacket rises to the height of the outlet 45 in the pipe 43, it enters this pipe, passing downwardly and out of the cooling compartment B through the outlet 48.

Due to the pressure created in the beer barrel or keg, beer is forced upwardly through the draught tube, through the pipes 42, and into the faucet, stopping at the valve when the valve is closed against its seat. During the time of service, cooling fluid, such as iced water, is circulated sequentially about the draught tube 1 and the pipes 42, thus effectually cooling any beer which may be trapped in the draught tube and the pipes and elsewhere within the cooling compartment B, by the fact that the valve in the faucet is closed. Thus, whenever the faucet is opened to discharge beer into a glass, stein or other receptacle, it is discharged at a palatable temperature, regardless of the interval of time occurring between successive openings of the faucet.

The beer in the barrel is maintained cooled to a desired temperature in any well-known manner, as, for example, by the maintenance of a bath of cold fluid about the barrel. The structure or device of the present invention maintains whatever beer there is in the draught tube and cooling compartment palatably cool, so that should intervals of considerable time elapse between successive draughts made from the faucet, the beer will be palatable.

For insulating the cooling compartment B, this compartment is surrounded by a covering 52 of rubber, rubber composition, or other suitable material effective to prevent rapid heat interchange between the atmosphere and the interior of the cooling compartment B. Preferably, this covering is applied over the margins of the upper head 28, as illustrated.

The faucet C is covered by a similar covering 53 for a like purpose. The coating 53 extends about the bored portion 32 of the casting, as illustrated, so that substantially all of the cooling compartment B and the faucet C is covered by this insulating material, thus effectually maintaining the beer within the cooling compartment and faucet at a palatable temperature for comparatively long periods of time.

It will be observed, from an inspection of Figure 1, that the several parts may be readily disasembled for cleaning purposes, so that the entire structure may thus be maintained in sanitary condition at all times.

It will further be observed that the lower header 40 is spaced from the lower head 9 of the cooling chamber B a slight distance, and that the upper header 41 is spaced a slight distance from the upper head 28. These spaces enable filling of the cooling compartment B by beer forced into this compartment by the pressure present in the barrel, so that there is at all times, within the cooling compartment B, a greater amount of beer, subject to the cooling action of this compartment, than is present in the draught tube 1.

By delivering the cooling fluid adjacent the bottom of the space 3, that is adjacent the lower end of the draught tube 1, efficient cooling of the beer within the draught tube is assured. Circulation of the cooling liquid from the space 3 to and through the water jacket of the cooling compartment B continues as long as the fluid is being supplied through the inlet 13, which, of course, is during the time that the barrel contains beer for dispensation through the faucet C.

At night time, or at any other time when the bar is closed, the circulating fluid will be stopped. In the morning, or at the commencement of another service period, the circulating cooling medium will be caused to circulate about the beer which is within the draught tube and within the cooling compartment B, for a sufficient length of time before drawing the first glassful from the faucet, to properly cool the beer within the structure.

In connection with the use of the device of the present invention, it has been ascertained that beer is discharged from the nozzle of the faucet without the formation of excessive foam, without sputtering, and under moderate pressure.

The terms "upper" and "lower" have been used herein for convenience and are not to be understood as limitations. These terms have been used because of the fact that the drawing is so arranged as to make the terms appropriate, and because in a structure of this kind it is advantageous to align the draught tube and the cooling chamber.

The invention has been described herein more or less precisely as to details, yet it is to be understood that the invention is not to be limited thereby, as changes may be made in the arrangement and proportions of parts, and equivalents may be substituted, without departing from the spirit and scope of the invention.

The invention is claimed as follows:

In a beer cooling and dispensing apparatus having an insulated fluid jacketed draught tube and an insulated faucet, the improvement of a cooler which comprises an insulated shell closed at its ends by heads, a lower head being adapted for removable connection to said draught tube and arranged to afford beer flow from the tube into the shell, the upper head being provided with a hollow nipple for threaded connection to said faucet in a manner to afford beer flow from the shell to said faucet, axially spaced apertured headers within said shell, pipes extending axially of said shell with their extremities entered in the header apertures, the apertures in said headers being so arranged as to laterally space said pipes one from another, the construction being such as to provide a water jacket about said pipes, a pipe having closed ends supported in said headers and having an overflow inlet near its upper end and an outlet near its lower end, a water inlet tube arranged to provide a water duct between said draught tube adjacent said lower shell head and said water jacket for water flow, a water outlet tube communicating with the outlet of said closed ended pipe, flanged means at the lower end of said cooler shell, and a ring nut in hooked engagement with said flange and in threaded engagement with the lower head.

FRANK E. RICE.